US012802024B2

(12) United States Patent
Liu et al.

(10) Patent No.: US 12,802,024 B2
(45) Date of Patent: Nov. 17, 2026

(54) FREIGHT RATE DETERMINATION METHOD AND RELATED APPARATUS

(71) Applicant: TRAVELSKY TECHNOLOGY LIMITED, Beijing (CN)

(72) Inventors: Hui Liu, Beijing (CN); Yi Yang, Beijing (CN); Liang Li, Beijing (CN); Songbai Yan, Beijing (CN); Jiarui Liu, Beijing (CN); Xinhong Wang, Beijing (CN); Xiaofei Shi, Beijing (CN); Xianhao Zhu, Beijing (CN)

(73) Assignee: TRAVELSKY TECHNOLOGY LIMITED, Beijing (CN)

( * ) Notice: Subject to any disclaimer, the term of this patent is extended or adjusted under 35 U.S.C. 154(b) by 0 days.

(21) Appl. No.: 19/105,998

(22) PCT Filed: Aug. 17, 2023

(86) PCT No.: PCT/CN2023/113486
§ 371 (c)(1),
(2) Date: Feb. 24, 2025

(87) PCT Pub. No.: WO2024/041441
PCT Pub. Date: Feb. 29, 2024

(65) Prior Publication Data

US 2026/0065215 A1 Mar. 5, 2026

(30) Foreign Application Priority Data

Aug. 23, 2022 (CN) ......................... 202211014535.5

(51) Int. Cl.
*G06Q 10/0834* (2023.01)
*G06Q 10/083* (2024.01)

(52) U.S. Cl.
CPC . *G06Q 10/08345* (2013.01); *G06Q 10/08355* (2013.01)

(58) Field of Classification Search
CPC ....... G06Q 10/08345; G06Q 10/08355; G06Q 10/083; G06Q 10/08743; G06Q 30/0206
See application file for complete search history.

(56) References Cited

U.S. PATENT DOCUMENTS

2008/0183512 A1* 7/2008 Benzinger ............ G01C 21/343 705/6
2010/0082394 A1* 4/2010 Pachon .................... G08G 5/00 705/7.29
2015/0161636 A1* 6/2015 Williams ........... G06Q 30/0206 705/7.35

FOREIGN PATENT DOCUMENTS

CN 105654259 A 6/2016
CN 110717794 A 1/2020
(Continued)

OTHER PUBLICATIONS

A. G. dos Santos and G. R. Mateus, "General hybrid column generation algorithm for crew scheduling problems using genetic algorithm," 2009 IEEE Congress on Evolutionary Computation, Trondheim, Norway, 2009, pp. 1799-1806, doi: 10.1109/CEC.2009.4983159. (Year: 2009).*
(Continued)

*Primary Examiner* — George Chen
*Assistant Examiner* — Tayar M Kyu
(74) *Attorney, Agent, or Firm* — Shumaker, Loop & Kendrick, LLP; James D. Miller

(57) ABSTRACT

A freight rate determination method and a related apparatus. The method may include: constructing at least one freight rate calculation group based on the freight rate query request; obtaining freight rate data corresponding to each of the at least one freight rate calculation group by querying from a database; filtering each piece of the freight rate data based on limit information and agent information in the freight rate query request, as well as a rule identifier and a
(Continued)

freight rate protocol identifier of each piece of the freight rate data in the freight rate calculation group, to obtain at least one piece of target freight rate data corresponding to the freight rate calculation group; and obtaining at least one freight rate combination by combining each piece of the target freight rate data corresponding to each freight rate calculation group based on a Column algorithm.

9 Claims, 3 Drawing Sheets

(56) References Cited

FOREIGN PATENT DOCUMENTS

| | | | |
|---|---|---|---|
| CN | 111949880 | A | 11/2020 |
| CN | 112215688 | A | 1/2021 |
| CN | 112307065 | A | 2/2021 |
| CN | 113934538 | A | 1/2022 |
| CN | 114331530 | A | 4/2022 |
| CN | 114372826 | A | 4/2022 |
| CN | 115345678 | A | 11/2022 |
| WO | 2015087026 | A1 | 6/2015 |

OTHER PUBLICATIONS

CN Office Action for Application No. 202211014535.5 dated Jan. 31, 2026.

* cited by examiner

FREIGHT RATE DETERMINATION METHOD AND RELATED APPARATUS

CROSS-REFERENCE TO RELATED PATENT APPLICATIONS

This disclosure is a U.S. national phase patent application of PCT/CN2023/113486 filed Aug. 17, 2023, and claims priority to Chinese Patent Application No. 202211014535.5 filed to the China National Intellectual Property Administration on Aug. 23, 2022 and entitled "Freight Rate Determination Method and Related Apparatus", the entire contents of each of which are hereby incorporated herein by reference.

TECHNICAL FIELD

The present disclosure relates to the field of aviation, and in particular, to a freight rate determination method and a related apparatus.

BACKGROUND

In the course of nearly two decades of history, the domestic civil aviation market has been growing rapidly and new service models are emerging. Therefore, system transaction timeouts are becoming more frequent, especially in some service scenarios, timeouts are especially prominent. Due to system performance constraints, the system can only return some low-priced products, which cannot meet the diverse content display needs of airline products and leads to a poor user experience.

SUMMARY

In view of the above problem, the present disclosure provides a freight rate determination method and a related apparatus, to overcome the above problem or at least partially solve the above problem.

A first aspect provides a freight rate determination method, including:

obtaining a freight rate query request for a first flight route, where the freight rate query request involves a plurality of legs of the first flight route;

constructing at least one freight rate calculation group based on the freight rate query request, where one freight rate calculation group corresponds to at least one leg;

obtaining freight rate data corresponding to each of the at least one freight rate calculation group by querying from a database, where one freight rate calculation group includes at least one piece of the freight rate data;

for any one freight rate calculation group, filtering each piece of the freight rate data based on to limit information and agent information in the freight rate query request, as well as a rule identifier and a freight rate protocol identifier of each piece of the freight rate data in the freight rate calculation group, to obtain at least one piece of target freight rate data corresponding to the freight rate calculation group;

obtaining at least one freight rate combination by combining each piece of the target freight rate data corresponding to each freight rate calculation group based on a Column algorithm, wherein each of the freight rate combination comprises one piece of the target freight rate data corresponding to each of the at least one freight rate calculation group.

A second aspect provides a freight rate determination apparatus, including: a request acquisition unit, a calculation group construction unit, a freight rate data query unit, a freight rate data filtration unit, and a freight rate data combination unit;

the request acquisition unit, configured to obtain a freight rate query request for a first flight route, wherein the freight rate query request involves a plurality of legs of the first flight route;

the calculation group construction unit, configured to construct at least one freight rate calculation group based on the freight rate query request, wherein one freight rate calculation group corresponds to at least one leg;

the freight rate data query unit, configured to obtaining freight rate data corresponding to each of the at least one freight rate calculation group by query from a database, wherein one freight rate calculation group comprises at least one piece of the freight rate data;

the freight rate data filtration unit, configured to, for any one freight rate calculation group, filter each piece of the freight rate data based on limit information and agent information in the freight rate query request, as well as a rule identifier and a freight rate protocol identifier of each piece of the freight rate data in the freight rate calculation group, to obtain at least one piece of target freight rate data corresponding to the freight rate calculation group; and the freight rate data combination unit, configured to obtain at least one freight rate combination by combining each piece of the target freight rate data corresponding to each freight rate calculation group based on a Column algorithm, wherein each of the freight rate combination comprises one piece of the target freight rate data corresponding to each of the at least one freight rate calculation group.

A third aspect provides a computer-readable storage medium, having a computer program stored thereon. The program implements, when being executed by a processor, the freight rate determination method described in any one of the above.

A fourth aspect provides an electronic device, including at least one processor, and at least one memory and a bus connected to the processor. The processor communicates with the memory through the bus; and the processor is configured to call a program instruction in the memory to execute the freight rate determination method described in any one of the above.

By the above technical solutions, based on the freight rate determination method and the related apparatus provided in the present disclosure, the freight rate query request for the first flight route may be obtained, and the freight rate query request involves the plurality of legs of the first flight route; the at least one freight rate calculation group is constructed based on the freight rate query request, and one freight rate calculation group corresponds to at least one leg; freight rate data corresponding to each of the at least one freight rate calculation group is obtained by querying from a database, and one freight rate calculation group includes the at least one piece of the freight rate data; for any one freight rate calculation group, each piece of the freight rate data is filtered based on the limit information and agent information in the freight rate query request, as well as the rule identifier and a freight rate protocol identifier of each piece of the freight rate data in the freight rate calculation group, to obtain the at least one piece of target freight rate data corresponding to the freight rate calculation group; and at least one freight rate combination is obtained by combining each piece of the target freight rate data corresponding to each freight rate calculation group based on a Column algorithm, and each of the freight rate combination includes one piece of the target freight rate data corresponding to each of the at least one freight rate calculation group. Therefore, it may be seen that, the present disclosure can improve the efficiency of freight rate calculation, and provide users with more choices, thus improving user experience.

The above descriptions are only an overview of the solutions of the present disclosure. In order to have a clearer understanding of the technical means of the present disclosure, and implement same based on the contents of the specification and in order to make the above and other purposes, features, and advantages of the present disclosure more obvious and easier to understand, the embodiments of the present disclosure are listed below.

BRIEF DESCRIPTION OF THE DRAWINGS

The foregoing and other features, advantages, and aspects of embodiments of the present disclosure will become more apparent in conjunction with the drawings and with reference to the following implementations. Throughout the drawings, the same or similar drawing signs indicate the same or similar elements. It should be understood that the drawings are schematic, and the components and elements are not necessarily drawn to scale.

Various other advantages and benefits will become clear to those of ordinary skill in the art by reading detailed description of preferred implementations below. The drawings are for the purpose of illustrating preferred implementations only and are not to be considered a limitation of the present disclosure. Furthermore, throughout the drawings, the same reference symbols are configured to indicate the same components. In the drawings.

DETAILED DESCRIPTION OF THE EMBODIMENTS

Figure 1:
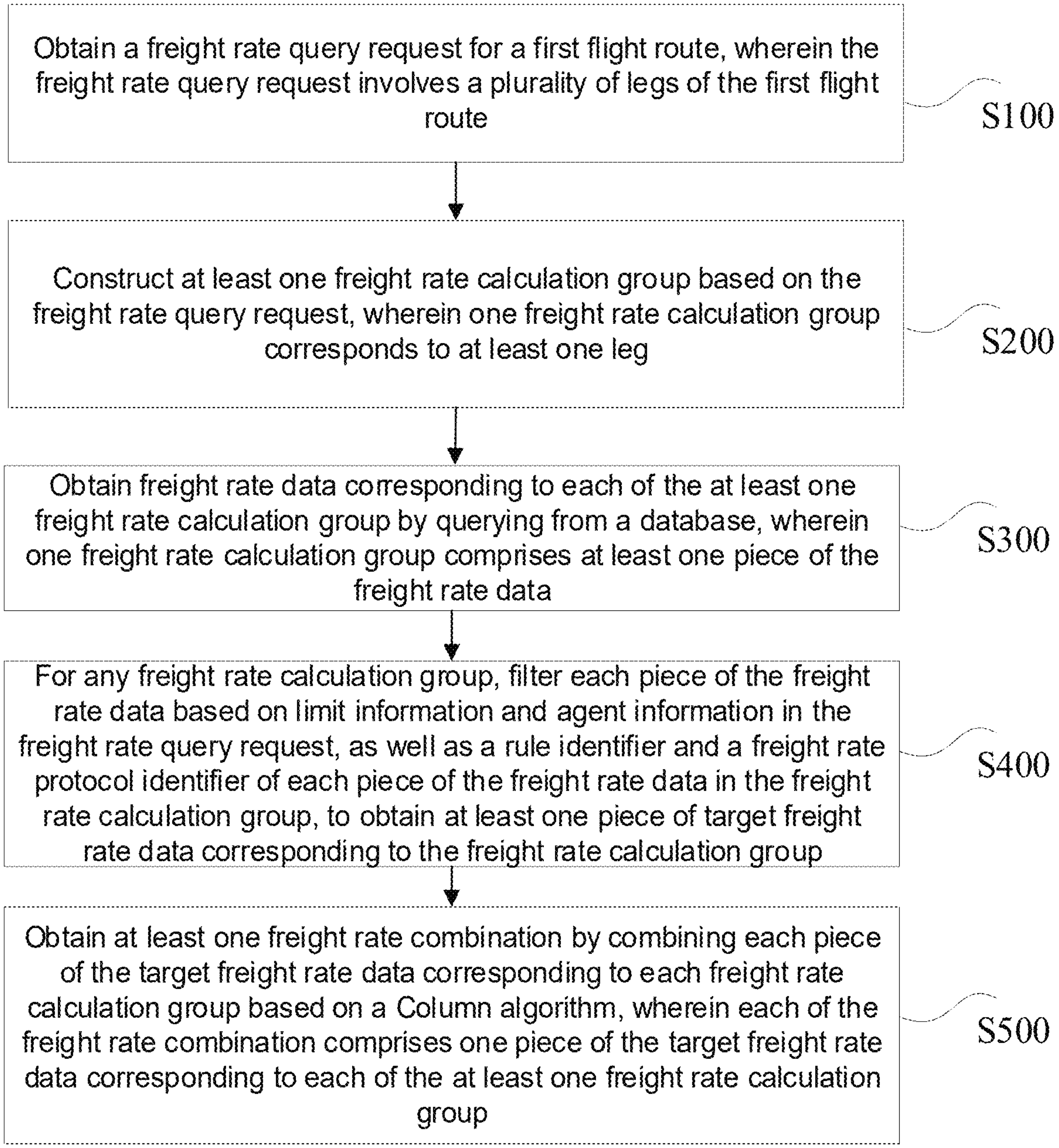
FIG. 1 is a flowchart of a freight rate determination method according to the present disclosure.

Embodiments of the present disclosure are described in further detail with reference to the drawings. Although some embodiments of the present disclosure are shown in the drawings, however, it should be understood that the present disclosure may be implemented in various forms and should not be construed as being limited to the embodiments set forth herein, but rather are provided for a more thorough and complete understanding of the present disclosure. It should be understood that the drawings and embodiments of the present disclosure are for exemplary purposes only and are not intended to limit the scope of protection of the present disclosure.

The term "including" and its variants used herein are open to include, that is, "include but not limited to". The term "based on" is "based at least in part on". The term "one embodiment" indicates "at least one embodiment"; the term "another embodiment" indicates "at least one additional embodiment"; and the term "some embodiments" indicates "at least some embodiments". Relevant definitions of other terms will be given in the description below.

It is to be noted that, the concepts of "first", "second", and the like mentioned in the present disclosure are only configured to distinguish different apparatuses, modules, or units, and are not configured to define the sequence or interdependence of the functions executed by these apparatuses, modules, or units.

It is to be noted that, the modifications of "one" and "a plurality of" referred to in the present disclosure are schematic and non-limiting, and should be understood by those skilled in the art to mean "at least one" unless the context clearly indicates otherwise.

As shown in FIG. 1, the present disclosure provides a freight rate determination method, including S100, S200, S300, S400, and S500.

At step of S100, obtaining a freight rate query request for a first flight route, wherein the freight rate query request involves a plurality of legs of the first flight route.

In an embodiment, in the present disclosure, the freight rate query request sent by a user or an airline agent may be obtained. Content included in the freight rate query request may be set based on actual requirements, and the present disclosure is not limited thereto.

In an embodiment, after an execution subject of the present disclosure receives the freight rate query request, an itinerary of the freight rate query request may be divided into the plurality of legs. For example, for an itinerary from Beijing (PEK) to Guangzhou (CAN) via Shanghai (SHA) and then return from Guangzhou (CAN) to Beijing (PEK), in the present disclosure, the itinerary may be divided into three legs, which are from PEK to SHA, from SHA to CAN, and from CAN to PEK, and the present disclosure is not limited thereto.

At step of S200, constructing at least one freight rate calculation group based on the freight rate query request, where one freight rate calculation group corresponds to at least one leg.

In an embodiment, as described above, in the present disclosure, the itinerary is divided into the plurality of legs, and at least one freight rate calculation group is constructed based on each of the legs (when only one freight rate calculation group is obtained through construction, data of the plurality of legs may be recorded in each piece of the freight rate data of the freight rate calculation group; and when one freight rate calculation group is correspondingly constructed based on one leg, only the data of the corresponding leg is recorded in each piece of the freight rate data of the freight rate calculation group). For example, for the leg from PEK to SHA, a freight rate calculation group 1 shown in Table 1 is obtained through querying; for the leg from SHA to CAN, a freight rate calculation group 2 shown in Table 2 is obtained through querying; and for the leg from CAN to PEK, a freight rate calculation group 3 shown in Table 3 is obtained through querying, and the present disclosure is not limited thereto.

TABLE 1

| freight rate | Price | Applicable passenger type | Applicable agent | Applicable major client |
|---|---|---|---|---|
| freight rate11 | 1000 | [Adults, children] | [Agent 1, Agent 2] | [Major client 1, major client 2] |
| freight rate12 | 1300 | [Adults, children] | [Agent 1] | [Major client 1] |
| freight rate13 | 1100 | [Adults] | [Agent 1] | [Major client 1] |
| freight rate14 | 1500 | [Adults] | [Agent 2] | [Major client 2] |
| freight rate15 | 1200 | [Children] | [Agent 2] | [Major client 1, major client 2] |

TABLE 2

| freight rate | Price | Applicable passenger type | Applicable agent | Applicable major client |
|---|---|---|---|---|
| freight rate21 | 700 | [Adults, children] | [Agent 1] | [Major client 2] |
| freight rate22 | 600 | [Adults] | [Agent 1, Agent 2] | [Major client 1] |
| freight rate23 | 800 | [Children] | [Agent 1] | [Major client 1, major client 2] |
| freight rate24 | 1000 | [Adults, children] | [Agent 2] | [Major client 2] |
| freight rate25 | 900 | [Adults] | [Agent 2] | [Major client 1, major client 2] |

TABLE 3

| freight rate | Price | Applicable passenger type | Applicable agent | Applicable major client |
|---|---|---|---|---|
| freight rate31 | 800 | [Adults, children] | [Agent 1, Agent 2] | [Major client 1] |
| freight rate32 | 900 | [Adults, children] | [Agent 1] | [Major client 1] |
| freight rate33 | 1000 | [Adults] | [Agent 1] | [Major client 1, major client 2] |
| freight rate34 | 1100 | [Adults] | [Agent 2] | [Major client 2] |
| freight rate35 | 700 | [Children] | [Agent 2] | [Major client 1, major client 2] |

In an embodiment, as shown in Table 1, Table 2, and Table 3, one piece of the freight rate data may include the freight rate, the price, the applicable passenger type, the applicable agent, and the applicable major client, and the present disclosure is not limited thereto.

At step of S300, obtaining freight rate data corresponding to each of the at least one freight rate calculation group by querying from a database, wherein one freight rate calculation group includes at least one piece of the freight rate data.

In an embodiment, as shown in Table 1, Table 2, and Table 3, in the present disclosure, the corresponding freight rate data may be queried from the table of the corresponding freight rate calculation group, to perform subsequent processing.

At step of S400, for any one freight rate calculation group, filtering each piece of the freight rate data based on limit information and agent information in the freight rate query request, as well as a rule identifier and a freight rate protocol identifier of each piece of the freight rate data in the freight rate calculation group, to obtain at least one piece of target freight rate data corresponding to the freight rate calculation group.

In an embodiment, as described above, in the present disclosure, content carried in the freight rate query request is not limited. The freight rate query request may carry the limit information and the agent information. The limit information can be understood as the information that is subject to limitations, for example, a flight departure time may be considered as the limit information. The agent information refers to information about a ticket agent, and the present disclosure is not limited thereto.

In an embodiment, in addition to the content shown in the above tables, each piece of the freight rate data may further include the rule identifier and the freight rate protocol identifier, and the present disclosure is not limited thereto.

It is to be noted that, different rule identifiers correspond to different preset limit conditions, which may be correspondingly understood as different preset limit rules. In the present disclosure, whether the limit information carried in the freight rate query request meets the preset limit condition corresponding to the rule identifier may be determined to filter the freight rate data.

Furthermore, the freight rate protocol identifier corresponds to different freight rate protocols, and agents permitted to sell under different freight rate protocol rules are different. Therefore, in the present disclosure, whether the agent information carried in the freight rate query request meets the agent specified in the freight rate protocol corresponding to the freight rate protocol identifier may be determined to filter the freight rate data.

In an embodiment, for the freight rate calculation group 1, the freight rate calculation group 2, and the freight rate calculation group 3, the step of S400 may be executed to respectively filter the freight rate data in the freight rate calculation group 1, the freight rate calculation group 2, and the freight rate calculation group 3, and the present disclosure is not limited thereto.

For example, with reference to the implementation shown in FIG. 1, in some optional implementations, the step of S400 includes S410 and S420.

At step of S410, for any one freight rate calculation group, performing rule filtration on each piece of the freight rate data of the freight rate calculation group based on the limit information in the freight rate query request and the rule identifier of each piece of the freight rate data in the freight rate calculation group, to obtain a first freight rate data group corresponding to the freight rate calculation group.

In an embodiment, as described above, rule filtration can be understood as determining whether the limit information carried in the freight rate query request meets the preset limit condition corresponding to the rule identifier, when the limit information carried in the freight rate query request meets the preset limit condition corresponding to the rule identifier, the corresponding freight rate data is reserved in the corresponding freight rate calculation group, otherwise the corresponding freight rate data is deleted from the corresponding freight rate calculation group, and the present disclosure is not limited thereto.

For example, with reference to the previous implementation, in some optional implementations, the step of S410 includes S411 and S412.

At step of S411, for any one freight rate calculation group, dividing each piece of the freight rate data of the freight rate calculation group into freight rate data groups of different rule classes based on the rule identifier of each piece of the freight rate data in the freight rate calculation group, wherein the rule identifiers of the freight rate calculation groups of the same rule class are the same, and the rule identifiers of the freight rate calculation groups of different rule classes are different.

In an embodiment, the freight rate data is grouped based on the rule identifier, such that the efficiency of rule filtration may be improved. That is, for any one freight rate data group of the rule class, when one piece of the freight rate data does not meet the corresponding preset limit condition, all of the freight rate data of the overall freight rate data group may be deleted from the corresponding freight rate calculation groups, repeated determination is not required, thereby achieving higher efficiency.

At step of S412, performing querying based on different rule identifiers to obtain a corresponding preset limit condition, and when the limit information in the freight rate query request meets the preset limit condition, obtaining the freight rate data group of the corresponding rule class, to obtain the first freight rate data group corresponding to the freight rate calculation group.

For example, freight rates are classified based on the rule, and the freight rate calculation group 1 is divided into two different freight rate data groups of the rule class based on the rule identifier: Rule1→[freight rate 11, freight rate 12, freight rate 14] and Rule2→[freight rate 13, freight rate 15], wherein Rule1 may be understood as a rule identifier 1, and Rule2 may be understood as a rule identifier 2. When the rule corresponding to the Rule1 is "for weekend departures", and the flight departure time carried in the freight rate query request is weekend, then three pieces of the freight rate data [freight rate 11, freight rate 12, freight rate 14] are passed for one time. When the rule corresponding to the Rule2 is "for departures from Monday to Friday", and the flight departure time carried in the freight rate query request is weekend, then two pieces of the freight rate data [freight rate 13, freight rate 15] are filtered for one time. After filtration, the obtained first freight rate data group includes three pieces of the freight rate data, which are freight rate 11, freight rate 12, and freight rate 14, and the present disclosure is not limited thereto.

At step of S420, for the first freight rate data group corresponding to any one freight rate calculation group, performing protocol filtration on each piece of the freight rate data in the first freight rate data group based on the agent information in the freight rate query request and the freight rate protocol identifier of each piece of the freight rate data in the freight rate calculation group, to obtain the at least one piece of the target freight rate data corresponding to the freight rate calculation group.

In an embodiment, after the rule filtration, in the present disclosure, protocol filtration may be executed continuously. As described above, in the present disclosure, whether the agent information carried in the freight rate query request meets the agent specified in the freight rate protocol corresponding to the freight rate protocol identifier may be determined.

For example, with reference to some optional implementations, the step of S420 includes S421 and S422.

At step of S421, for the first freight rate data group corresponding to any freight rate calculation group, dividing each piece of the freight rate data of the first freight rate data group into freight rate data groups of different protocol classes based on the freight rate protocol identifier of each piece of the freight rate data in the first freight rate data group, wherein the freight rate protocol identifiers of the freight rate data groups of the same protocol class are the same, and the freight rate protocol identifiers of the freight rate data groups of different protocol class are different.

Likewise, in order to improve efficiency, in the present disclosure, the freight rate data may be grouped based on the freight rate protocol identifier, to filter the freight rate data group for one time, and the present disclosure is not limited thereto.

In an embodiment, as described above, different freight rate protocol identifiers correspond to different freight rate protocols, and different freight rate protocols correspondingly stipulate that agents permitted to sell are different. For any one freight rate data, when the corresponding freight rate protocol stipulates that the agents permitted to sell do not include agents carried in the freight rate query request, the corresponding freight rate data is deleted from the corresponding first freight rate data group, otherwise the corresponding freight rate data is reserved in the corresponding first freight rate data group, and the present disclosure is not limited thereto.

At step of S422, performing querying based on different freight rate protocol identifiers to obtain a corresponding preset agent set, and when the agent information in the freight rate query request falls within a range of the preset agent set, obtaining the freight rate data group of the corresponding protocol class, to obtain the target freight rate data corresponding to the freight rate calculation group.

In an embodiment, the preset agent set may be understood as all agents permitted to sell that are stipulated by the corresponding freight rate protocol.

In an embodiment, after the series of filtration, each piece of the target freight rate data shown in Table 4 may be obtained for the freight rate calculation group 1; each piece of the target freight rate data shown in Table 5 may be obtained for the freight rate calculation group 2; and each piece of the target freight rate data shown in Table 6 may be obtained for the freight rate calculation group 3, and the present disclosure is not limited thereto.

TABLE 4

| freight rate | Price | Applicable passenger type | Applicable agent | Applicable major client |
|---|---|---|---|---|
| freight rate11 | 1000 | [Adults, children] | [Agent 1, Agent 2] | [Major client 1, major client 2] |
| freight rate12 | 1300 | [Adults, children] | [Agent 1] | [Major client 1] |
| freight rate14 | 1500 | [Adults] | [Agent 2] | [Major client 2] |

TABLE 5

| freight rate | Price | Applicable passenger type | Applicable agent | Applicable major client |
|---|---|---|---|---|
| freight rate22 | 600 | [Adults] | [Agent 1, Agent 2] | [Major client 1] |
| freight rate21 | 700 | [Adults, children] | [Agent 1] | [Major client 2] |
| freight rate23 | 800 | [Children] | [Agent 1] | [Major client 1, major client 2] |

TABLE 6

| freight rate | Price | Applicable passenger type | Applicable agent | Applicable major client |
|---|---|---|---|---|
| freight rate31 | 800 | [Adults, children] | [Agent 1, Agent 2] | [Major client 1] |
| freight rate33 | 1000 | [Adults] | [Agent 1] | [Major client 1, major client 2] |

In an embodiment, three groups of the target freight rate data are obtained, and in the present disclosure, the freight rate combination of the entire flight route may be obtained through combination, that is, one piece of target freight rate data is selected from Table 4, Table 5, and Table 6, and the freight rate combination of the first flight route is obtained through combination. Therefore, it may be seen that there are many combination modes, and appropriate combinations may be performed based on actual requirements in the present disclosure.

At step of S500, obtaining at least one freight rate combination by combining each piece of the target freight rate data corresponding to each freight rate calculation group based on a Column algorithm, wherein each of the freight rate combination includes one piece of the target freight rate data corresponding to each of the at least one freight rate calculation group.

For example, with reference to the implementation shown in FIG. 1, in some optional implementations, the step of S500 includes S510, S520, S530, and S540.

At step of S510, for any one freight rate calculation group, based on a price in each piece of the corresponding target freight rate data, sorting and numbering each piece of the target freight rate data based on a sequence from small to large.

In an embodiment, in the present disclosure, sorting is performed by only using the price as weight. In addition to the price, in the present disclosure, other weight terms may also be set, and priorities and weight ratios of the corresponding weight terms are set, such that a total weight is obtained through calculation, and sorting is performed based on the total weight, and the present disclosure is not limited thereto.

At step of S520, for any one freight rate calculation group, selecting target freight rate data which has a lowest price from the freight rate calculation group, and obtaining a first freight rate combination by combining the target freight rate data which has a lowest price based on the Column algorithm, wherein the first freight rate combination includes a plurality of columns of data, and one column of data corresponds to the target freight rate data which has the lowest price in one freight rate calculation group.

In an embodiment, the Column algorithm belongs to the well-known concepts in the art, and is not described too much in the present disclosure, details are referred to the relevant description in the art.

At step of S530, based on the first freight rate combination, modifying any one column of data into a next piece of the target freight rate data in the corresponding freight rate calculation group, to obtain a plurality of second freight rate combinations through extension, wherein the modified data is defined as an extended column of the corresponding second freight rate combination.

At step of S540, for any one second freight rate combination, starting from a position of the extended column, modifying any one column of data into the next piece of the target freight rate data in the corresponding freight rate calculation group, to obtain a plurality of third freight rate combinations through extension, and so on, until the number of the obtained freight rate combinations is equal to a preset combination number threshold.

In an embodiment, in the present disclosure, it is can also be applied by performing the above process until all the freight rate combinations are obtained, that is, the corresponding preset combination number threshold is set, for each freight rate query request, it stops until all the freight rate combinations are obtained, and the present disclosure is not limited thereto.

In an embodiment, with reference to the previous implementation, in some optional implementations, after the step of S530, the method further includes S531, S532, and S533.

At step of S531, for any one second freight rate combination, verifying a combination rule corresponding to the second freight rate combination.

At step of S532, when the combination rule corresponding to the second freight rate combination passes the verification, obtaining the second freight rate combination.

At step of S533, when the combination rule corresponding to the second freight rate combination fails the verification, abandoning the second freight rate combination.

For example, by using Table 4, Table 5, and Table 6 as an example, there are 18 freight rate combinations in total. The first among the freight rate combinations is [freight rate 11, freight rate 22, freight rate 31], and as it is the first freight rate combination, the extended column is set to 1. For the freight rate combination, an intersection of the applicable passenger types, agents, and major clients is taken, which is [Adults], [Agent 1, Agent 2], and [Major client 1], respectively. The second freight rate combination obtained through extension is [freight rate 12, freight rate 22, freight rate 31], [freight rate 11, freight rate 21, freight rate 31], and [freight rate 11, freight rate 22, freight rate 33]. When the combination rule of the freight rate 22 and the freight rate 31 fails the verification (for example, the rule identifier of the freight rate 22 is "R1", the rule specified by R1 requires that a freight rate combined with the freight rate 22 must use the same rule, and the rule identifier of the freight rate 31 is "R2", that is, the freight rate 22 cannot be combined with the freight rate 31, such that the combination rule fails the verification), the [freight rate 12, freight rate 22, freight rate 31] is directly determined as an invalid combination, as the freight rate 22 and the freight rate 31 that cannot be combined are still included.

By using the [freight rate 12, freight rate 22, freight rate 31] as an example, the freight rate combination is obtained by extending the first column, and the applicable passenger type remains unchanged from the previous freight rate 11, such that the applicable passenger type of the freight rate combination maintains consistent with a result of the previous freight rate combination. Likewise, the processing of the applicable agents and major clients is completed.

By using the [freight rate 11, freight rate 21, freight rate 31] as an example, the freight rate combination is obtained by extending the second column, compared with the freight rate 22, for the applicable agent, [Agent 2] is absent, the applicable agent of the candidate freight rate combination is [Agent 1, Agent 2]-[Agent 2]=[Agent 1]. Likewise, the processing of the applicable passenger types and major clients is completed. When the third freight rate combination is re-generated based on the freight rate combination, extension starts from the second column, and the re-generated third freight rate combination is [freight rate 11, freight rate 23, freight rate 31] and [freight rate 11, freight rate 21, freight rate 33].

Based on this processing process, a freight rate calculation process of one freight rate calculation mode has been completed. Service requirements are to calculate as many results as possible among all freight rate calculation modes from high to low based on the weights. In the present disclosure, freight rate result selection among a plurality of freight rate calculation modes is completed by using a heap sort algorithm.

In an embodiment, in order to further clear the solution of the present disclosure, by continuously using the above examples as an example, the first among the freight rate calculation groups has a freight rate data set [freight rate 11, freight rate 12, . . . , freight rate 11], [freight rate 21, freight rate 22, . . . , freight rate 2m], [freight rate 31, freight rate 32, . . . , freight rate 3n]. The freight rate sets in the 3 freight rate calculation groups are sorted from high to low according to the weights, such that the first among the freight rate combinations of the calculation mode is [freight rate 11, freight rate 21, freight rate 31], and a weight accumulation value of the freight rate combination is greater than that of other freight rate combinations. The extended column of the freight rate combination is recorded as 1, which is extended from Column 1. The subsequent freight rate combinations are extended based on a parent freight rate combination, extension starts from an extended column of the parent freight rate combination, each subsequent freight rate combination only extends 1 column, and the next freight rate is used.

In this example, the subsequent freight rate combination of the [freight rate 11, freight rate 21, freight rate 31] starts to be extended from the Column 1, to generate 3 freight rate combinations. [freight rate 12, freight rate 21, freight rate 31] is obtained by extending the Column 1, and the extended column is recorded as 1; [freight rate 11, freight rate 22, freight rate 31] is obtained by extending Column 2, and the extended column is recorded as 2; and [freight rate 11, freight rate 21, freight rate 32] is obtained by extending Column 3, and the extended column is recorded as 3.

When the subsequent freight rate combination is generated by the [freight rate 11, freight rate 22, freight rate 31], and since the extended column of the freight rate combination is 2, 2 freight rate combinations are obtained by extending from the Column 2. [freight rate 11, freight rate 23, freight rate 31] is obtained by extending Column 2, and the extended column is recorded as 2; and [freight rate 11, freight rate 22, freight rate 32] is obtained by extending Column 3, and the extended column is recorded as 3.

Then, a result generation process of a plurality of passengers is used as an example. After each passenger type obtains a result by the Column algorithm, combination processing is performed on results of all the passenger types. Each freight rate result, that is, the freight rate combination has content such as applicable flights, cabins, agents, etc. When a plurality of passenger freight rate results are combined, an intersection of the applicable content is required, that is to say, the same applicable flights, cabins, agents, etc. are required among the freight rate results of the plurality of passengers.

The process of combining the plurality of passenger results still uses the Column algorithm, each passenger type is used as a column, and since the result of each passenger type is obtained through the Column algorithm, the result with the highest weight can be inevitably obtained when the column is extended according to the passenger type. Furthermore, during the generation of the freight rate result of some passenger, the result may be generated among other passengers. For example, an adult passenger generates a freight rate combination [freight rate 11, freight rate 23, freight rate 31], and a child passenger also generates the freight rate combination [freight rate 11, freight rate 23, freight rate 31], such that by using the prior results of the adult passenger, it assumes that the freight rate combination fails combination verification in the adult passenger, the child passenger may directly use the combination verification result of the freight rate combination, and re-verification is not required.

The flowcharts and block diagrams in the drawings illustrate probably implemented system architectures, functions, and operations of the system, method, and computer program product according to various embodiments of the present disclosure. On this aspect, each block in the flowcharts or block diagrams may represent a module, a program segment, or a portion of a code, which includes at least one executable instruction for implementing the logic functions. It is also to be noted that, in certain alternative implementations, the functions marked in the blocks may also be realized in a sequence different from those marked in the drawings. For example, two blocks shown in succession may, in fact, be executed substantially in parallel, and sometimes in a reverse sequence, depending upon the functionality involved. It is also to be noted that each block of the block diagrams and/or flowcharts and combinations of blocks in the block diagrams and/or flowcharts may be implemented by dedicated hardware-based systems that execute the functions or operations, or may be implemented in a combination of dedicated hardware and computer instructions.

Names of messages or information interacted among a plurality of devices of the implementations of the present disclosure are used for illustrative purposes only and are not intended to limit the scope of those messages or information.

Although each operation is depicted in a particular order, this should not be construed as requiring that these operations be performed in the particular order shown or in sequential order for execution. Multitasking and parallel processing may be advantageous in certain environments.

It should be understood that all steps documented in the method implementations of the present disclosure may be executed according to different sequences, and/or in parallel. Furthermore, the method implementations may include additional steps and/or omit performing the shown steps. Limitations are not imposed in the scope of the present disclosure thereto.

In the present disclosure, the computer program code configured to execute operations in the present disclosure may be compiled by using at least one programming language or a combination thereof. The programming languages include a programming language facing an object, such as Java, Smalltalk, and C++, and further include a conventional procedural programming language, such as "C" language, or similar programming languages. The program code may be completely executed in a computer of a user or partially executed in the computer of the user, executed as an independent software package, executed partially in the computer of the user and partially in a remote computer, or executed completely in the remote server or a server. In a situation involving the remote computer, the remote computer may be connected to the user computer by using any type of network including a local area network (LAN) or a wide area network (WAN), or may be connected to an external computer (for example, connected to the external computer through the Internet by using an Internet service provider).

Figure 2:
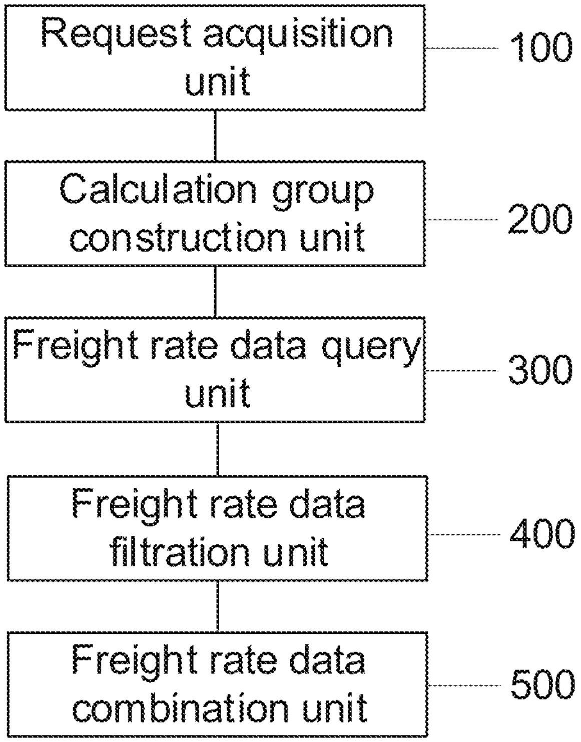
FIG. 2 is a schematic structural diagram of a freight rate determination apparatus according to the present disclosure.

As shown in FIG. 2, the present disclosure provides a freight rate determination apparatus, including: a request acquisition unit 100, a calculation group construction unit 200, a freight rate data query unit 300, a freight rate data filtration unit 400, and a freight rate data combination unit 500.

The request acquisition unit 100 is configured to obtain a freight rate query request for a first flight route, wherein the freight rate query request involves a plurality of legs of the first flight route.

The calculation group construction unit 200 is configured to construct at least one freight rate calculation group based on the freight rate query request, wherein one freight rate calculation group corresponds to at least one leg.

The freight rate data query unit 300 is configured to obtain freight rate data corresponding to each of the at least one freight rate calculation group by querying from a database, wherein one freight rate calculation group includes at least one piece of the freight rate data.

The freight rate data filtration unit 400 is configured to, for any one freight rate calculation group, filter each piece of the freight rate data based on limit information and agent information in the freight rate query request, as well as a rule identifier and a freight rate protocol identifier of each piece of the freight rate data in the freight rate calculation group, to obtain at least one piece of target freight rate data corresponding to the freight rate calculation group.

The freight rate data combination unit 500 is configured to obtained at least one freight rate combination by combining each piece of the target freight rate data corresponding to each freight rate calculation group based on a Column algorithm, wherein each of the freight rate combination includes one piece of the target freight rate data corresponding to each of the freight rate calculation groups.

In combination with the implementations shown in FIG. 2, in some optional implementations, the freight rate data filtration unit 400 includes a rule filtration sub-unit and a protocol filtration sub-unit.

The rule filtration sub-unit is configured to, for any one freight rate calculation group, perform rule filtration on each piece of the freight rate data of the freight rate calculation group based on the limit information in the freight rate query request and the rule identifier of each piece of the freight rate data in the freight rate calculation group, to obtain a first freight rate data group corresponding to the freight rate calculation group.

The protocol filtration sub-unit is configured to, for the first freight rate data group corresponding to any one freight rate calculation group, perform protocol filtration on each piece of the freight rate data in the first freight rate data group based on the agent information in the freight rate query request and the freight rate protocol identifier of each piece of the freight rate data in the freight rate calculation group, to obtain the at least one piece of the target freight rate data corresponding to the freight rate calculation group.

In combination with the previous implementation, in some optional implementations, the rule filtration sub-unit includes a rule class grouping sub-unit and a first data group acquisition sub-unit.

The rule class grouping sub-unit is configured to, for any one freight rate calculation group, divide each piece of the freight rate data of the freight rate calculation group into freight rate data groups of different rule classes based on the rule identifier of each piece of the freight rate data in the freight rate calculation group, wherein the rule identifiers of the freight rate calculation groups of the same rule class are the same, and the rule identifiers of the freight rate calculation groups of different rule classes are different.

The first data group acquisition sub-unit is configured to perform querying based on different rule identifiers to obtain a corresponding preset limit condition, and when the limit information in the freight rate query request meets the preset limit condition, obtain the freight rate data group of the corresponding rule class, to obtain the first freight rate data group corresponding to the freight rate calculation group.

In an embodiment, in combination with a second apparatus implementation, the protocol filtration sub-unit includes a protocol class grouping sub-unit and a target data acquisition sub-unit.

The protocol class grouping sub-unit is configured to, for the first freight rate data group corresponding to any one freight rate calculation group, divide each piece of the freight rate data of the first freight rate data group into freight rate data groups of different protocol classes based on the freight rate protocol identifier of each piece of the freight rate data in the first freight rate data group, wherein the freight rate protocol identifiers of the freight rate data groups of the same protocol class are the same, and the freight rate protocol identifiers of the freight rate data groups of different protocol class are different.

The target data acquisition sub-unit is configured to perform querying based on different freight rate protocol identifiers to obtain a corresponding preset agent set, and when the agent information in the freight rate query request falls within a range of the preset agent set, obtain the freight rate data group of the corresponding protocol class, to obtain the target freight rate data corresponding to the freight rate calculation group.

In combination with the implementation shown in FIG. 1, in some optional implementations, the freight rate data combination unit 500 includes a data numbering sub-unit, a first freight rate combination sub-unit, a second freight rate combination sub-unit, and a freight rate cycle combination sub-unit.

The data numbering sub-unit is configured to, for any one freight rate calculation group, based on a price in each piece of the corresponding target freight rate data, sort and number each piece of the target freight rate data based on a sequence from small to large.

The first freight rate combination sub-unit is configured to, for any one freight rate calculation group, select target freight rate data which has a lowest price from the freight rate calculation group, and obtain a first freight rate combination by combining the target freight rate data which has a lowest price based on the Column algorithm, wherein the first freight rate combination includes a plurality of columns of data, and one column of data corresponds to the target freight rate data with the lowest price in one freight rate calculation group.

The second freight rate combination sub-unit is configured to, based on the first freight rate combination, modify any one column of data into a next piece of the target freight rate data in the corresponding freight rate calculation group, to obtain a plurality of second freight rate combinations through extension, wherein modified data is defined as an extended column of the corresponding second freight rate combination.

The freight rate cycle combination sub-unit is configured to, for any one second freight rate combination, starting from a position of the extended column, modify any one column of data into the next piece of the target freight rate data in the corresponding freight rate calculation group, to obtain a plurality of third freight rate combinations through extension, and so on, until the number of the obtained freight rate combinations is equal to a preset combination number threshold.

In combination with the previous implementation, in some optional implementations, the apparatus further includes a combination rule verification unit, a first verification result unit, and a second verification result unit.

The combination rule verification unit is configured to, based on the first freight rate combination, modify any one column of data into a next piece of the target freight rate data in the corresponding freight rate calculation group, to obtain a plurality of second freight rate combinations through extension, wherein after the modified data is defined as an extended column of the corresponding second freight rate combination, for any one second freight rate combination, a combination rule corresponding to the second freight rate combination is verified.

The first verification result unit is configured to, when the combination rule corresponding to the second freight rate combination passes the verification obtain the second freight rate combination.

The second verification result unit is configured to, when the combination rule corresponding to the second freight rate combination fails the verification, abandon the second freight rate combination.

The present disclosure provides a computer-readable storage medium, having a computer program stored thereon. The program implements, when being executed by a processor, the freight rate determination method described in any one of the above.

Figure 3:
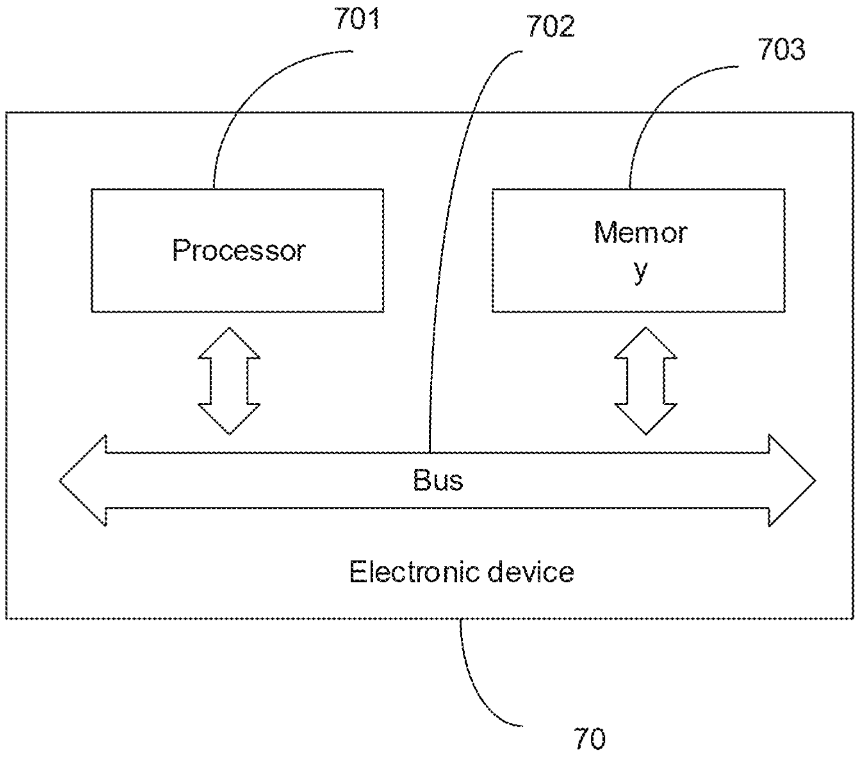
FIG. 3 is a schematic structural diagram of an electronic device according to the present disclosure.

As shown in FIG. 3, the present disclosure provides an electronic device 70. The electronic device 70 includes at least one processor 701, and at least one memory 702 and a bus 703 connected to the processor 701. The processor 701 communicates with the memory 702 through the bus 703; and the processor 701 is configured to call a program instruction in the memory 702 to execute the freight rate determination method described in any one of the above.

Although the present subject has been described using language specific to structural features and/or logical actions of the method, it should be understood that the subject limited in the appended claims is not necessarily limited to the particular features or actions described above. On the contrary, the particular features and actions described above are merely exemplary forms of implementing the claims.

Although several implementation details are included in the above discussion, these should not be construed as limiting the scope of the present disclosure. Certain features described in the context of separate embodiments may also be implemented the single embodiment in a combination manner. On the contrary, the various features described in the context of the single embodiment may also be implemented in the plurality of embodiments, either individually or in any suitable sub-combinations.

The above descriptions are merely the preferred embodiments and the used technical principles of the present disclosure. It should be understood by those skilled in the art that the disclosed scope involved in the present disclosure is not limited to the technical solution formed by a particular combination of the above technical features, but should also cover other technical solutions formed by any combination of the above technical features or their equivalent features without departing from the above disclosed concept, for example, the solutions formed by interchanging the above features with (but not limited to) technical features having similar functions disclosed in the present disclosure.

What is claimed is:

1. A freight rate determination method, comprising:

obtaining a freight rate query request for a first flight route, wherein the freight rate query request involves a plurality of legs of the first flight route;

constructing at least one freight rate calculation group based on the freight rate query request, wherein one freight rate calculation group corresponds to at least one leg;

obtaining freight rate data corresponding to each of the at least one freight rate calculation group by querying from a database, wherein one freight rate calculation group comprises at least one piece of the freight rate data;

for any one freight rate calculation group, filtering each piece of the freight rate data based on limit information and agent information in the freight rate query request, as well as a rule identifier and a freight rate protocol identifier of each piece of the freight rate data in the freight rate calculation group, to obtain at least one piece of target freight rate data corresponding to the freight rate calculation group; and obtaining at least one freight rate combination by combining each piece of the target freight rate data corresponding to each freight rate calculation group based on a Column algorithm, wherein each of the freight rate combination comprises one piece of the target freight rate data corresponding to each of the at least one freight rate calculation group;

wherein the obtaining at least one freight rate combination by combining each piece of the target freight rate data corresponding to each freight rate calculation group based on a Column algorithm comprises:

for any one freight rate calculation group, based on a price in each piece of the corresponding target freight rate data, sorting and numbering each piece of the target freight rate data based on a sequence from small to large;

for any one freight rate calculation group, selecting target freight rate data which has a lowest price from the freight rate calculation group, and obtaining a first freight rate combination by combining the target freight rate data which has a lowest price based on the Column algorithm, wherein the first freight rate combination comprises a plurality of columns of data, and one column of data corresponds to the target freight rate data which has the lowest price in one freight rate calculation group;

based on the first freight rate combination, modifying any one column of data into a next piece of the target freight rate data in the corresponding freight rate calculation group, to obtain a plurality of second freight rate combinations through extension, wherein modified data is defined as an extended column of the corresponding second freight rate combination; and for any one second freight rate combination, starting from a position of the extended column, modifying any one column of data into the next piece of the target freight rate data in the corresponding freight rate calculation group, to obtain a plurality of third freight rate combinations through extension, and so on, until the number of the obtained freight rate combinations is equal to a preset combination number threshold.

2. The method as claimed in claim 1, wherein after based on the first freight rate combination, modifying any one column of data into the next piece of the target freight rate data in the corresponding freight rate calculation group, to obtain the plurality of second freight rate combinations through extension, wherein modified data is defined as the extended column of the corresponding second freight rate combination, the method further comprising:

for any one second freight rate combination, verifying a combination rule corresponding to the second freight rate combination;

when the combination rule corresponding to the second freight rate combination passes the verification, obtaining the second freight rate combination; and when the combination rule corresponding to the second freight rate combination fails the verification, abandoning the second freight rate combination.

3. The method as claimed in claim 1, wherein the for any one freight rate calculation group, filtering each piece of the freight rate data based on the limit information and agent information in the freight rate query request, as well as a rule identifier and a freight rate protocol identifier of each piece of the freight rate data in the freight rate calculation group, to obtain at least one piece of the target freight rate data corresponding to the freight rate calculation group comprises:

for any one freight rate calculation group, performing rule filtration on each piece of the freight rate data of the freight rate calculation group based on the limit information in the freight rate query request and the rule identifier of each piece of the freight rate data in the freight rate calculation group, to obtain a first freight rate data group corresponding to the freight rate calculation group; and for the first freight rate data group corresponding to any one freight rate calculation group, performing protocol filtration on each piece of the freight rate data in the first freight rate data group based on the agent information in the freight rate query request and the freight rate protocol identifier of each piece of the freight rate data in the freight rate calculation group, to obtain the at least one piece of the target freight rate data corresponding to the freight rate calculation group.

4. The method as claimed in claim 3, wherein the for any one freight rate calculation group, performing rule filtration on each piece of the freight rate data of the freight rate calculation group based on the limit information in the freight rate query request and the rule identifier of each piece of the freight rate data in the freight rate calculation group, to obtain a first freight rate data group corresponding to the freight rate calculation group comprises:

for any one freight rate calculation group, dividing each piece of the freight rate data of the freight rate calculation group into freight rate data groups of different rule classes based on the rule identifier of each piece of the freight rate data in the freight rate calculation group, wherein the rule identifiers of the freight rate calculation groups of the same rule class are the same, and the rule identifiers of the freight rate calculation groups of different rule classes are different; and performing querying based on different rule identifiers to obtain a corresponding preset limit condition, and when the limit information in the freight rate query request meets the preset limit condition, obtaining the freight rate data group of the corresponding rule class, to obtain the first freight rate data group corresponding to the freight rate calculation group.

5. The method as claimed in claim 3, wherein the for the first freight rate data group corresponding to any one freight rate calculation group, performing protocol filtration on each piece of the freight rate data in the first freight rate data group based on the agent information in the freight rate query request and the freight rate protocol identifier of each piece of the freight rate data in the freight rate calculation group, to obtain the at least one piece of the target freight rate data corresponding to the freight rate calculation group comprises:

for the first freight rate data group corresponding to any one freight rate calculation group, dividing each piece of the freight rate data of the first freight rate data group into freight rate data groups of different protocol classes based on the freight rate protocol identifier of each piece of the freight rate data in the first freight rate data group, wherein the freight rate protocol identifiers of the freight rate data groups of the same protocol class are the same, and the freight rate protocol identifiers of the freight rate data groups of different protocol class are different; and performing querying based on different freight rate protocol identifiers to obtain a corresponding preset agent set, and when the agent information in the freight rate query request falls within a range of the preset agent set, obtaining the freight rate data group of the corresponding protocol class, to obtain the target freight rate data corresponding to the freight rate calculation group.

6. A freight rate determination apparatus, comprising: a request acquisition unit, a calculation group construction unit, a freight rate data query unit, a freight rate data filtration unit, and a freight rate data combination unit a hardware processor coupled with a memory and configured to execute program elements stored on the memory, wherein the program elements comprise:

the request acquisition unit, configured to obtain a freight rate query request for a first flight route, wherein the freight rate query request involves a plurality of legs of the first flight route;

the calculation group construction unit, configured to construct at least one freight rate calculation group based on the freight rate query request, wherein one freight rate calculation group corresponds to at least one leg;

the freight rate data query unit, configured to obtain freight rate data corresponding to each of the at least one freight rate calculation group by query from a database, wherein one freight rate calculation group comprises at least one piece of the freight rate data;

the freight rate data filtration unit, configured to, for any one freight rate calculation group, filter each piece of the freight rate data based on limit information and agent information in the freight rate query request, as well as a rule identifier and a freight rate protocol identifier of each piece of the freight rate data in the freight rate calculation group, to obtain at least one piece of target freight rate data corresponding to the freight rate calculation group; and the freight rate data combination unit, configured to obtain at least one freight rate combination by combining each piece of the target freight rate data corresponding to each freight rate calculation group based on a Column algorithm, wherein each of the freight rate combination comprises one piece of the target freight rate data corresponding to each of the at least one freight rate calculation group;

wherein the freight rate data combination unit comprises a data numbering sub-unit, a first freight rate combination sub-unit, a second freight rate combination sub-unit, and a freight rate cycle combination sub-unit;

the data numbering sub-unit is configured to, for any one freight rate calculation group, based on a price in each piece of the corresponding target freight rate data, sort and number each piece of the target freight rate data based on a sequence from small to large;

the first freight rate combination sub-unit is configured to, for any one freight rate calculation group, select target freight rate data which has a lowest price from the freight rate calculation group, and obtain a first freight rate combination by combining the target freight rate data which has a lowest price based on the Column algorithm, wherein the first freight rate combination includes a plurality of columns of data, and one column of data corresponds to the target freight rate data with the lowest price in one freight rate calculation group;

the second freight rate combination sub-unit is configured to, based on the first freight rate combination, modify any one column of data into a next piece of the target freight rate data in the corresponding freight rate calculation group, to obtain a plurality of second freight rate combinations through extension, wherein modified data is defined as an extended column of the corresponding second freight rate combination;

the freight rate cycle combination sub-unit is configured to, for any one second freight rate combination, starting from a position of the extended column, modify any one column of data into the next piece of the target freight rate data in the corresponding freight rate calculation group, to obtain a plurality of third freight rate combinations through extension, and so on, until the number of the obtained freight rate combinations is equal to a preset combination number threshold.

7. The apparatus as claimed in claim 6, wherein the freight rate data filtration unit comprises a rule filtration sub-unit and a protocol filtration sub-unit, a hardware processor coupled with a memory and configured to execute program elements stored on the memory, wherein the program elements comprise:

the rule filtration sub-unit, configured to, for any one freight rate calculation group, perform rule filtration on each piece of the freight rate data of the freight rate calculation group based on the limit information in the freight rate query request and the rule identifier of each piece of the freight rate data in the freight rate calculation group, to obtain a first freight rate data group corresponding to the freight rate calculation group; and the protocol filtration sub-unit, configured to, for the first freight rate data group corresponding to any freight rate calculation group, perform protocol filtration on each piece of the freight rate data in the first freight rate data group based on the agent information in the freight rate query request and the freight rate protocol identifier of each piece of the freight rate data in the freight rate calculation group, to obtain the at least one piece of the target freight rate data corresponding to the freight rate calculation group.

8. A computer-readable storage medium, having a computer program stored thereon, wherein the program implements following actions when being executed by a processor:

obtain a freight rate query request for a first flight route, wherein the freight rate query request involves a plurality of legs of the first flight route;

construct at least one freight rate calculation group based on the freight rate query request, wherein one freight rate calculation group corresponds to at least one leg;

obtain freight rate data corresponding to each of the at least one freight rate calculation group by querying from a database, wherein one freight rate calculation group comprises at least one piece of the freight rate data;

for any one freight rate calculation group, filter each piece of the freight rate data based on limit information and agent information in the freight rate query request, as well as a rule identifier and a freight rate protocol identifier of each piece of the freight rate data in the freight rate calculation group, to obtain at least one piece of target freight rate data corresponding to the freight rate calculation group; and obtain at least one freight rate combination by combining each piece of the target freight rate data corresponding to each freight rate calculation group based on a Column algorithm, wherein each of the freight rate combination comprises one piece of the target freight rate data corresponding to each of the at least one freight rate calculation group;

for any one freight rate calculation group, based on a price in each piece of the corresponding target freight rate data, sort and number each piece of the target freight rate data based on a sequence from small to large;

for any one freight rate calculation group, select target freight rate data which has a lowest price from the freight rate calculation group, and obtain a first freight rate combination by combining the target freight rate data which has a lowest price based on the Column algorithm, wherein the first freight rate combination comprises a plurality of columns of data, and one column of data corresponds to the target freight rate data which has the lowest price in one freight rate calculation group;

based on the first freight rate combination, modify any one column of data into a next piece of the target freight rate data in the corresponding freight rate calculation group, to obtain a plurality of second freight rate combinations through extension, wherein modified data is defined as an extended column of the corresponding second freight rate combination; and for any one second freight rate combination, start from a position of the extended column, modify any one column of data into the next piece of the target freight rate data in the corresponding freight rate calculation group, to obtain a plurality of third freight rate combinations through extension, and so on, until the number of the obtained freight rate combinations is equal to a preset combination number threshold.

9. An electronic device, comprising at least one processor, and at least one memory and a bus connected to the processor, wherein the processor communicates with the memory through the bus; and the processor is configured to call a program instruction in the memory to execute following actions:

obtain a freight rate query request for a first flight route, wherein the freight rate query request involves a plurality of legs of the first flight route;

construct at least one freight rate calculation group based on the freight rate query request, wherein one freight rate calculation group corresponds to at least one leg;

obtain freight rate data corresponding to each of the at least one freight rate calculation group by querying from a database, wherein one freight rate calculation group comprises at least one piece of the freight rate data;

for any one freight rate calculation group, filter each piece of the freight rate data based on limit information and agent information in the freight rate query request, as well as a rule identifier and a freight rate protocol identifier of each piece of the freight rate data in the freight rate calculation group, to obtain at least one piece of target freight rate data corresponding to the freight rate calculation group; and obtain at least one freight rate combination by combining each piece of the target freight rate data corresponding to each freight rate calculation group based on a Column algorithm, wherein each of the freight rate combination comprises one piece of the target freight rate data corresponding to each of the at least one freight rate calculation group;

for any one freight rate calculation group, based on a price in each piece of the corresponding target freight rate data, sort and number each piece of the target freight rate data based on a sequence from small to large;

for any one freight rate calculation group, select target freight rate data which has a lowest price from the freight rate calculation group, and obtain a first freight rate combination by combining the target freight rate data which has a lowest price based on the Column algorithm, wherein the first freight rate combination comprises a plurality of columns of data, and one column of data corresponds to the target freight rate data which has the lowest price in one freight rate calculation group;

based on the first freight rate combination, modify any one column of data into a next piece of the target freight rate data in the corresponding freight rate calculation group, to obtain a plurality of second freight rate combinations through extension, wherein modified data is defined as an extended column of the corresponding second freight rate combination; and for any one second freight rate combination, start from a position of the extended column, modify any one column of data into the next piece of the target freight rate data in the corresponding freight rate calculation group, to obtain a plurality of third freight rate combinations through extension, and so on, until the number of the obtained freight rate combinations is equal to a preset combination number threshold.

* * * * *